UNITED STATES PATENT OFFICE.

GEORGE KRAMER, OF DYSART, IOWA.

WEED-DESTROYER.

1,354,043.　　　Specification of Letters Patent.　Patented Sept. 28, 1920.

No Drawing.　　Application filed October 23, 1919. Serial No. 332,807.

*To all whom it may concern:*

Be it known that I, GEORGE KRAMER, citizen of Transylvania, formerly Austria-Hungary, residing at Dysart, in the county of Tama and State of Iowa, have invented certain new and useful Improvements in Weed-Destroyers; and I do hereby declare the following to be a full, clear, and exact description of the invention, such as will enable others skilled in the art to which it appertains to make and use the same.

The object of my invention is to produce a compound which may be strewed over fields infested with noxious weeds, such as Canada thistles, quack-grass, or other farm pests, and thus destroy the weeds, without any permanent injury to the soil.

The invention consists of the following composition of materials, in about the proportions stated, and by weight: lye, 10 parts, slack coal, 40 parts, saltpeter, 20 parts, salt, 10 parts.

These are mixed in any order, and when intimately commingled form a powdery mass, practically dry, which may be sown by hand, or otherwise, over a weed-infested field. In a day or two the weeds will have been killed, even to the roots. The field may then be plowed, preferably after a few weeks allowed for some of the poison to pass out of the soil. Experience has shown that a good crop, of oats or corn, may be grown from soil so treated. A better practice, however, is to turn a drove of hogs into the field, and allow them to root it over, which they do most thoroughly, consuming the dead roots of the weeds with relish. This is in part due to the presence of salt and in part to their liking for slack coal, which is used for this purpose, and also to give body to the mixture. When well rooted over the field is plowed and tilled in the usual way, and will be found to be weed-free and productive.

By "slack coal" is to be understood the finely granulated residual coal deposited in the handling of coal, or screened from the coarser elements thereof, the term being in general commercial use.

Having thus described my invention, I claim:

A weed-destroying compound, composed of substantially equal portions of lye and salt, a larger portion than either of saltpeter, and a larger portion of slack coal than of saltpeter.

In testimony whereof I affix my signature in presence of two witnesses.

GEORGE KRAMER.

Witnesses:
　E. E. WIEBEN,
　CHAS. I. CIRPS.